US009646269B1

(12) United States Patent
Ben-Cnaan et al.

(10) Patent No.: US 9,646,269 B1
(45) Date of Patent: May 9, 2017

(54) SYSTEM, METHOD, AND COMPUTER PROGRAM FOR CENTRALIZED GUIDED TESTING

(71) Applicant: Amdocs Software Systems Limited, Dublin (IE)

(72) Inventors: Talmon Ben-Cnaan, Hod-HaSharon (IL); Ighal Szyk, Kefar Saba (IL); Sharon Elgarat, Kibbutz Mefalsim (IL); Assaf Ben David, Oranit (IL); Pankaj Baishya, Brampton (CA)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 76 days.

(21) Appl. No.: 14/559,834

(22) Filed: Dec. 3, 2014

Related U.S. Application Data

(60) Provisional application No. 61/911,976, filed on Dec. 4, 2013.

(51) Int. Cl.
| | |
|---|---|
| *G06F 9/44* | (2006.01) |
| *G06Q 10/06* | (2012.01) |
| *G06F 11/36* | (2006.01) |

(52) U.S. Cl.
CPC ......... *G06Q 10/06* (2013.01); *G06F 11/3692* (2013.01); *G06F 11/368* (2013.01); *G06F 11/3664* (2013.01); *G06F 11/3696* (2013.01)

(58) Field of Classification Search
CPC ..... G06F 8/30; G06F 8/41; G06F 8/71; G06F 9/44; G06F 11/368; G06F 11/3692; G06Q 10/06

USPC ........................................................ 717/101
See application file for complete search history.

(56) References Cited

U.S. PATENT DOCUMENTS

| | | | |
|---|---|---|---|
| 6,031,990 | A | 2/2000 | Sivakumar et al. |
| 6,219,829 | B1 | 4/2001 | Sivakumar et al. |
| 7,020,797 | B2 | 3/2006 | Patil |
| 7,313,564 | B2 * | 12/2007 | Melamed ............ G06F 11/3684 707/999.01 |
| 8,473,916 | B2 | 6/2013 | Venkatraman et al. |

(Continued)

FOREIGN PATENT DOCUMENTS

| | | |
|---|---|---|
| EP | 1577760 A2 | 9/2005 |
| WO | 2008070108 A1 | 6/2008 |
| WO | 2013078269 A1 | 5/2013 |

*Primary Examiner* — Qing Chen
*Assistant Examiner* — Mohammed Huda
(74) *Attorney, Agent, or Firm* — Zilka-Kotab, PC

(57) ABSTRACT

A system, method, and computer program product are provided for centralized guided testing. In use, at least one software testing project is identified. Additionally, data associated with the at least one software testing project is accessed from at least one of a plurality of knowledge repositories that are capable of being dynamically and constantly updated, the plurality of knowledge repositories including: at least one first repository including official testing methodology associated with a plurality of testing processes; at least one second repository including test project management information; at least one third repository including test knowledge information provided by users; and at least one fourth repository including historical testing project information and ongoing testing project information. Further, the data associated with the at least one software testing project is presented utilizing at least one user interface.

11 Claims, 5 Drawing Sheets

(56) References Cited

U.S. PATENT DOCUMENTS

| | | | |
|---|---|---|---|
| 8,561,036 B1 * | 10/2013 | Beans | G06F 11/368 |
| | | | 717/124 |
| 2008/0244523 A1 * | 10/2008 | Kelso | G06F 11/3664 |
| | | | 717/124 |
| 2009/0300423 A1 | 12/2009 | Ferris | |
| 2011/0016454 A1 | 1/2011 | Paintal et al. | |
| 2012/0017195 A1 * | 1/2012 | Kaulgud | G06F 11/3692 |
| | | | 717/101 |

* cited by examiner

SYSTEM, METHOD, AND COMPUTER PROGRAM FOR CENTRALIZED GUIDED TESTING

CLAIM OF PRIORITY

This application claims the benefit of U.S. Provisional Application No. 61/911,976, filed Dec. 4, 2013, the entire contents of which are incorporated herein by reference.

FIELD OF THE INVENTION

The present invention relates to software testing projects, and more particularly to efficiently managing such software testing projects.

BACKGROUND

The testing of software is a critical step in the software development lifecycle. The objective of the testing is to verify and validate the integration of the software, the hardware and the configuration thereof, and to prevent malfunction of the software when in use.

Crucial steps to avoiding inefficiencies in software testing include developing and managing effective test plans. However, current techniques for managing testing projects fail to provide a holistic approach to management.

There is thus a need for addressing these and/or other issues associated with the prior art.

SUMMARY

A system, method, and computer program product are provided for centralized guided testing. In use, at least one software testing project is identified. Additionally, data associated with the at least one software testing project is accessed from at least one of a plurality of knowledge repositories that are capable of being dynamically and constantly updated, the plurality of knowledge repositories including: at least one first repository including official testing methodology associated with a plurality of testing processes; at least one second repository including test project management information; at least one third repository including test knowledge information provided by users; and at least one fourth repository including historical testing project information and ongoing testing project information. Further, the data associated with the at least one software testing project is presented utilizing at least one user interface.

DETAILED DESCRIPTION

Figure 1:
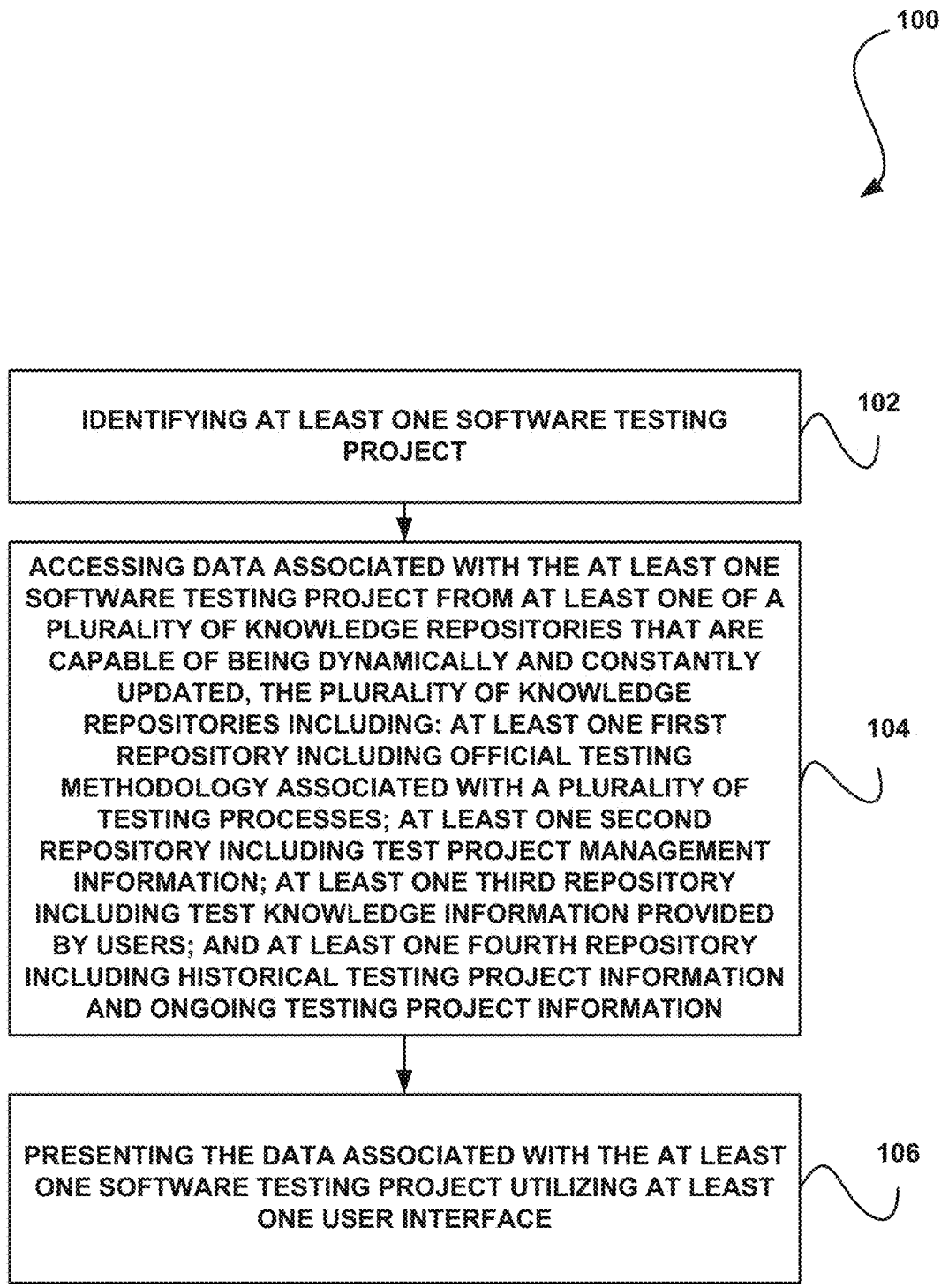
FIG. 1 illustrates a method for centralized guided testing, in accordance with one embodiment.

FIG. 1 illustrates a method 100 for centralized guided testing, in accordance with one embodiment.

As shown, at least one software testing project is identified. See operation 102. The software testing project may include one or more projects and/or various portions of a larger testing project.

Additionally, the testing project may be associated with various aspects of software testing (e.g. functional, integration, performance, connectivity, automation, etc.) and various industries (e.g. telecommunication service providers, etc.). Accordingly, the testing project may be associated with various products and different business lines, such as telecommunication business lines (e.g. wireless, wire line, broadband, etc.). In one embodiment, identifying the software testing project may include identifying one or more projects based on user input received from a user interface.

As shown further in FIG. 1, data associated with the at least one software testing project is accessed from at least one of a plurality of knowledge repositories that are capable of being dynamically and constantly updated. See operation 104. The data may include any data associated with a software testing project (e.g. including data associated with past or current software testing projects, etc.).

The plurality of knowledge repositories include: at least one first repository including official testing methodology associated with a plurality of testing processes; at least one second repository including test project management information; at least one third repository including test knowledge information provided by users; and at least one fourth repository including historical testing project information and ongoing testing project information. The knowledge repositories may be associated with, or part of, various databases and/or memory. Additionally, in various embodiments, some or all of the knowledge repositories may be combined into common repositories and/or spread out across multiple repositories. However, such repositories and associated data may be accessed by a centralized location (e.g. utilizing a user interface).

The data associated with the at least one software testing project is presented utilizing at least one user interface. See operation 106. The data may be presented in a variety of forms utilizing a variety of techniques (e.g. based on a testing stage, user input, etc.).

For example, presenting the data associated with the software testing project utilizing the user interface may include presenting a step-by-step test management process associated with the software testing project that itemizes required resources needed for each step.

As another example, presenting the data utilizing the user interface may include presenting the data as a test report. In this case, the method 100 may include generating at least one report utilizing the accessed data associated with the software testing project. As an example, the report may include a current view of a status of the software testing project, etc.

Additionally, the data may be utilized to perform an analysis including an analysis of a level of service provided for a plurality of software testing projects. In this case, the analysis may be performed according to different knowledge areas and different benchmarks, etc.

In various embodiments, the plurality of knowledge repositories may include various information and may help facilitate various functionality. For example, in one embodiment, the first repository including the official testing methodology associated with the testing processes may include official testing methodology generated and maintained by one or more testing experts.

Additionally, the first repository including the official testing methodology may be organized according to different knowledge areas. In this case, each of the different knowledge areas may be associated with one or more of the testing processes.

The testing processes may include various activity sets. In this case, each activity in an activity set may be linked to a unique set of relevant resources. The relevant resources may include, for example, tools, document templates, guide books, and/or lists, etc.

The second repository including the test project management information may be used to manage testing projects. For example, in one embodiment, the second repository including the test project management information may include guidelines and individual steps for a plurality of software testing projects. In this case, the guidelines and individual steps for the software testing projects may be generated according to project properties and a testing methodology associated with a corresponding software testing project. Additionally, the second repository including the test project management information may further include project status information.

Furthermore, the third repository including the test knowledge information provided by users may include an evolving set of repositories managed by experts. For example, the evolving set of repositories may be actively updated by a general testing population with real hands-on knowledge. In this case, in one embodiment, the real hands-on knowledge may serve as input for updates to the official testing methodology.

Still yet, the repository including the historical testing project information and the ongoing testing project information may be used for analysis to improve current services by utilizing the historical testing project information to locate patterns of items that require improvements.

Accordingly, the method 100 may be utilized to implement a system for executing and managing software testing projects using one dynamic, constantly updated set of knowledge repositories. The system may be located on a cloud allowing all users access from any network. In addition to serving as a unified source for testing methodologies, this system may be utilized to provide a step-by-step test management tool, pin-pointing required resources needed for each step. A domain within the repositories may be extended to provide access to end business customers to directly view project testing artifacts and provide feedback The system may also be used to generate reports and perform history-based analytics, both on a single project level and on an entire testing project repository, which may be further used for improved management of projects. The reports and recommendations may be made available on multiple platforms including Mobile access, Tablet and any platform users may can securely obtain access. An additional feature of the system is the social component that allows knowledge contribution by employees and experts, etc. The centralized guided testing domain serves as a single point of knowledge, while allowing supervised changes and evolution to all its components.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
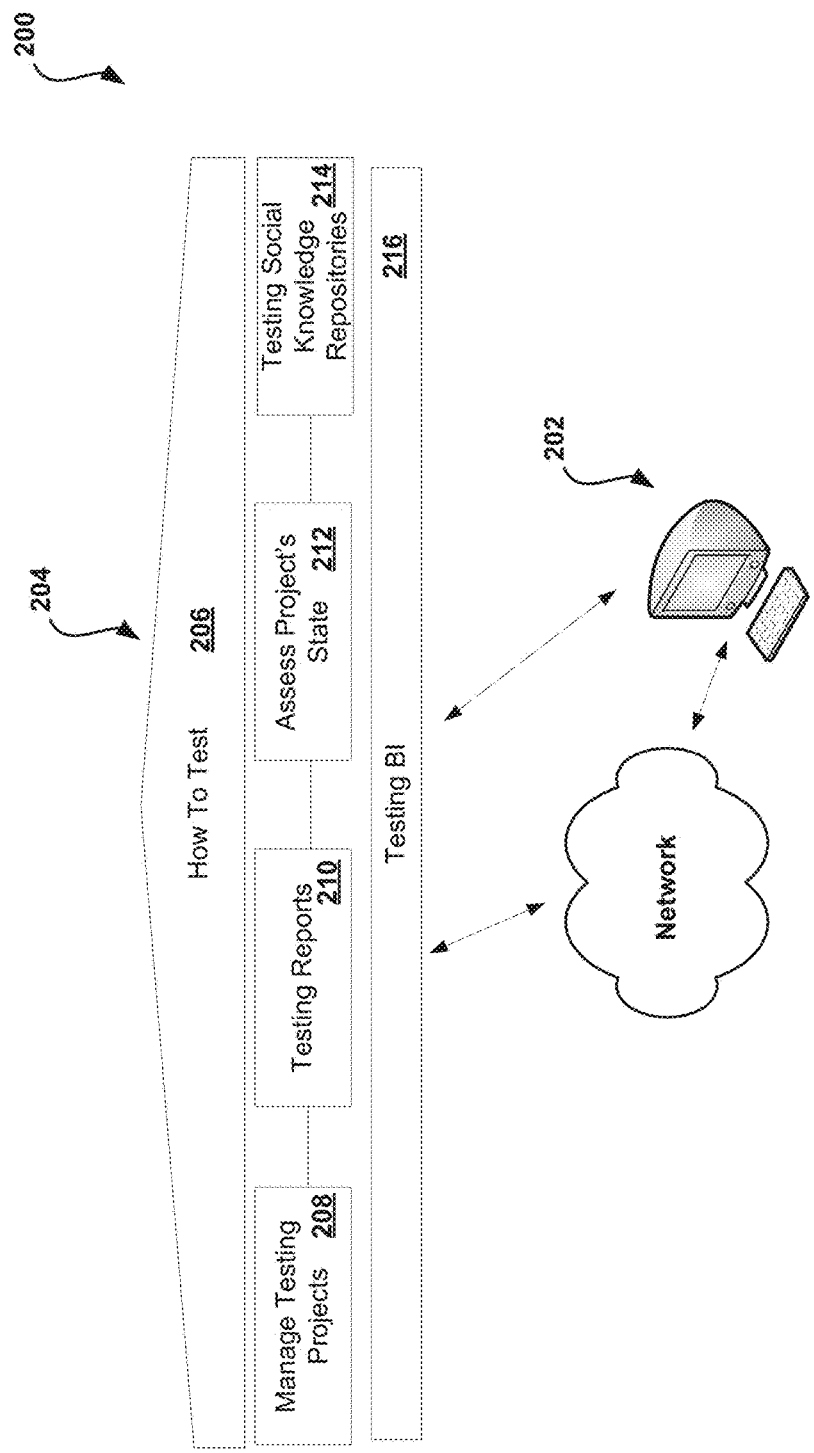
FIG. 2 illustrates a system architecture for centralized guided testing, in accordance with one embodiment.

FIG. 2 illustrates a system architecture 200 for centralized guided testing, in accordance with one embodiment. As an option, the system architecture 200 may be implemented in the context of the details of FIG. 1. Of course, however, the system architecture 200 may be implemented in the context of any desired environment. Further, the aforementioned definitions may equally apply to the description below.

As shown, a system 202 may have access to a testing framework 204 including various modules and repositories, etc., over one or more networks and/or directly/locally.

As shown further, in one embodiment, the testing framework 204 may be divided into six main components, which may be configured to support different complementary aspects of testing. This may include, for example, methodologies and guidelines, reporting and quality assessments, and continuous improvement.

Each of these aspects details the complex characteristics in testing projects including different testing streams (e.g. functional, integration, performance, connectivity, automation, etc.), different project types (e.g. migration, enhancement, technical upgrades, etc.), different products, and different business lines (e.g. telecom business lines, such as wireless, wire line, broadband, etc.).

Although, in various embodiments, the framework 204 may include various components, in this example, the components include a repository 206 including official testing methodology associated with a plurality of testing processes, a repository 208 including test project management information, a testing report generation module 210, a project state analysis module 212, a repository 214 including test knowledge information provided by users, and a repository 216 including historical testing project information and ongoing testing project information.

In accordance with one embodiment, the repository 206 is a repository including all official testing methodologies that are generated and maintained by a group of testing experts. The repository 206 may be organized according to different knowledge areas, each holding several testing processes. These processes may include activities sets, where each activity is linked to its unique set of relevant resources (e.g. tools, document templates, guide books, lists, etc.).

The repository 208 may be used to manage testing projects where, for each project, the repository 208 contains a set of guidelines and individual steps generated according to project properties and testing methodology. In addition, the repository 208 may include a project status, along with all documents and administrative data associated with various projects. To further assist project managers, relevant links to required methodology may also be included in or provided by the repository 208 to insure the supply of standardized best practice testing services.

The testing report generation module 210 may function as a reporting mechanism, generating a real-time view of statuses for projects. The testing report generation module 210 may function to allow users to follow up on all project aspects, from a manager's subjective view of risks and concerns, through the factual key performance indicators (KPIs), and even the level of compliance with the testing methodology of the testing organization.

The generated reports may allow top level management a clear transparency of all projects using a single standard language and form. The generated reports may also allow individual project managers the ability to insure the service they provide fits the organization's top measurements. Also, the generated reports may allow single testers to obtain the full picture of a project on which they work.

The project state analysis module 212 may function to provide an analysis of the level of service provided for each testing project. This may be performed according to different knowledge areas and different benchmarks. In addition, each project may be linked to improvement suggestions according to specific analysis of the project state analysis module 212.

The repository 214 may include an evolving set of repositories managed by experts, with active contributions by the general testing population to collect all real hands-on knowledge, expose live best practices, and serve as input for updates to the testing methodology.

The repository 216 may serve as a data warehouse storing all historical and ongoing project data. The repository 216 may also be used for analysis aimed to improve current services by utilizing the historical data to locate patterns of items that require improvements. For example, historical data on bug ridden areas can lead a better choice of test cases for upcoming testing projects.

The testing framework 204 may be implemented by a user using the system 202 to support all capabilities described herein and to serve as a single point of knowledge for all users related to testing services, while allowing supervised changes and evolution to its components.

Thus, the framework 204 functions to provide: a single unified source of testing data for all organization members; a methodology held in a guided process detailing, at each activity, resources and the actions and guidelines required to reach success; a lessons learned repository assisted by a business information internal tool to insure rules-based analysis are followed; an integration with a social repository to insure rapid distribution to all projects worldwide; and various sets of worldwide training social repositories, enabling experts to train experts.

Figure 3:
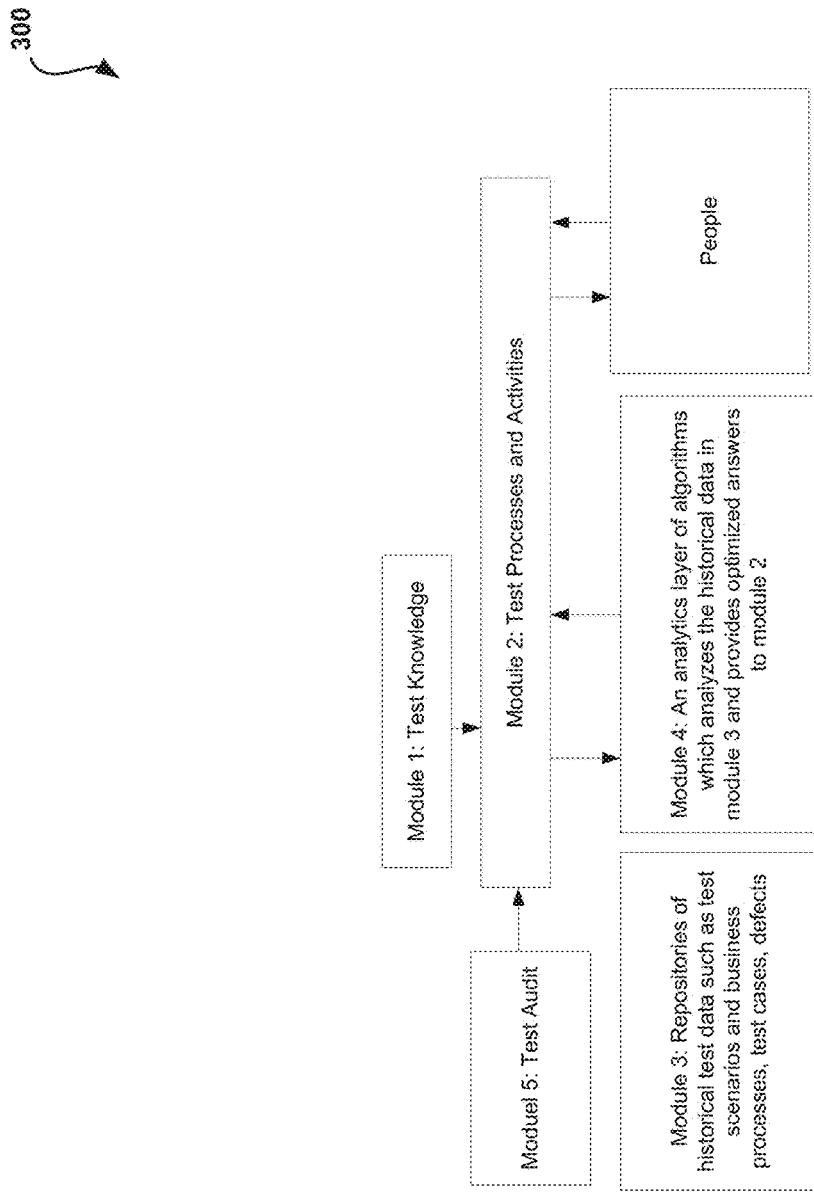
FIG. 3 illustrates a flow diagram for centralized guided testing, in accordance with one embodiment.

FIG. 3 illustrates a system flow diagram 300 for centralized guided testing, in accordance with one embodiment. As an option, the system flow diagram 300 may be implemented in the context of the details of the previous Figures. Of course, however, the system flow diagram 300 may be implemented in the context of any desired environment. Further, the aforementioned definitions may equally apply to the description below.

As shown, a system may utilize various modules (e.g. software components, computer code, etc.) to facilitate centralized guided testing. For example, a first module may supply test knowledge to a second module associated with test processes and activities. Further, a third module may be associated with repositories of historical test data such as test scenarios and business processes, test cases, defects, etc.

A fourth module may provide an analytics layer of algorithms that analyzes the historical data from the third module and provides optimized answers to the second module. Additionally, a fifth module may provide test audit information to the second module. Moreover, users may also provide input/feedback to the second module.

Figure 4:
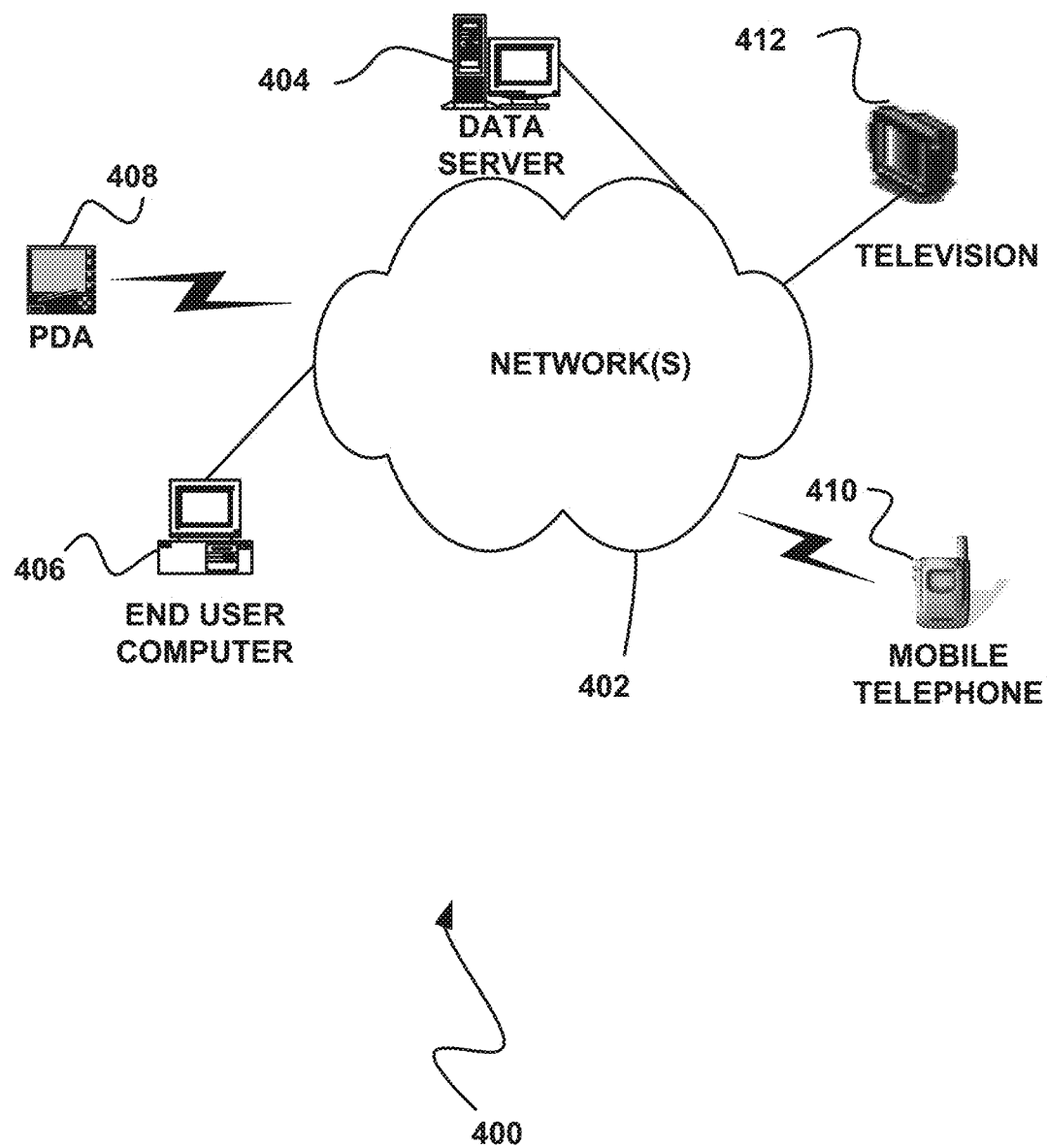
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
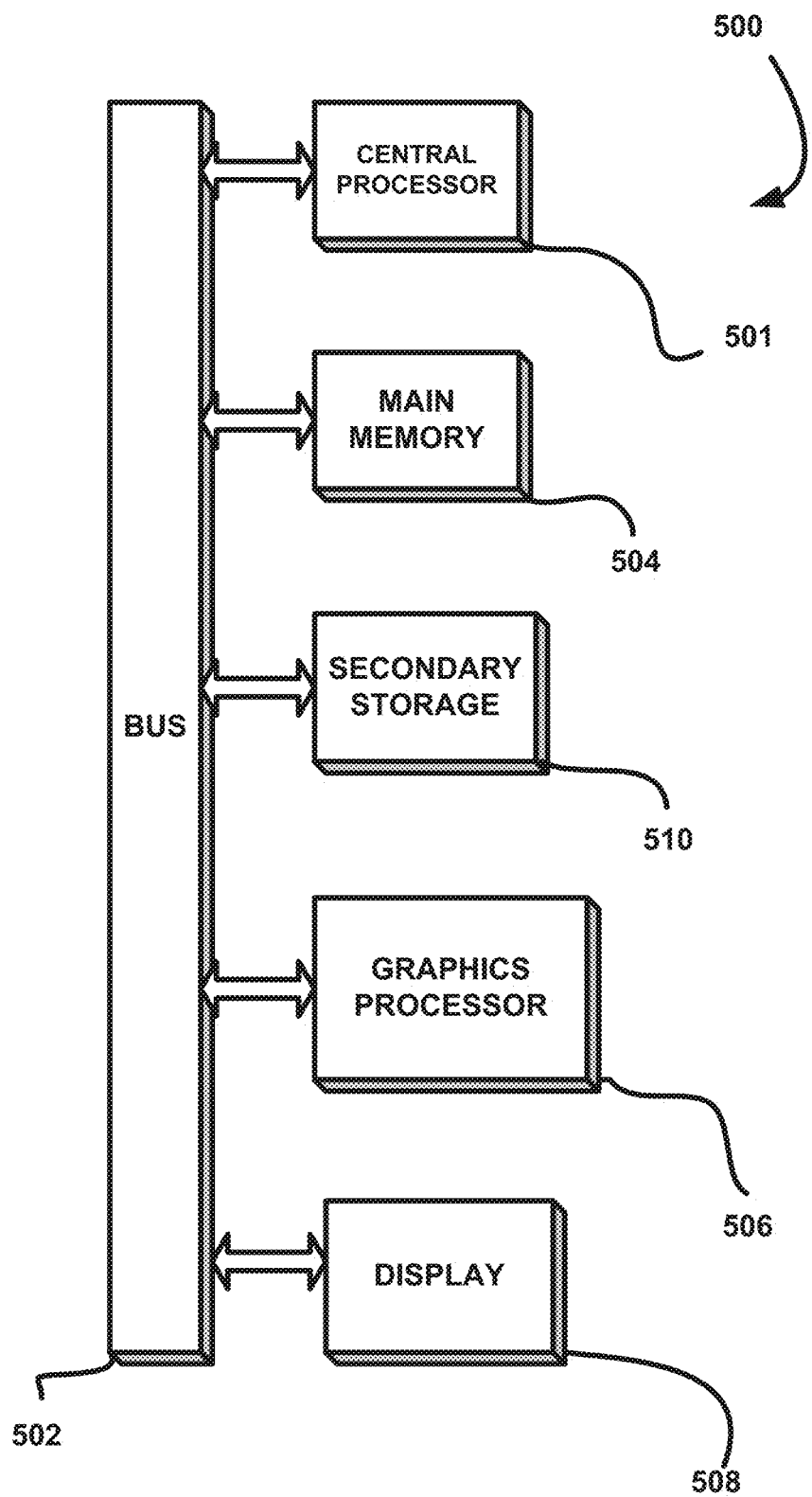
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
computer code for providing, in a testing framework, a plurality of knowledge repositories, the knowledge repositories being separate and being contributed to by a plurality of users through a central location, and the knowledge repositories further including:
at least one first repository including official testing methodology organized according to a plurality of testing processes that include activity sets with each activity being linked to a unique set of resources;
at least one second repository including test project management information for use in managing software testing projects, the test project management information including guidelines and individual steps for the software testing projects which, for each of the software testing projects, are generated according to properties and a testing methodology associated with the software testing project;
at least one third repository including test knowledge information, the test knowledge information being used as input for updates to the official testing methodology in the first repository; and
at least one fourth repository including historical testing project information and ongoing testing project information;
computer code for providing, in the testing framework, a plurality of modules corresponding to the knowledge repositories, the modules including:
a first module that supplies test knowledge to a second module associated with test processes and activities, a third module associated with the at least one fourth repository, a fourth module that includes an analytics layer of algorithms that analyzes the historical testing project information received from the third module and provides optimized answers to the second module, and a fifth module that provides test audit information to the second module;

computer code for executing the modules of the testing framework to execute each of the software testing projects to generate data associated with each of the software testing projects; and computer code for presenting the data associated with each of the software testing projects utilizing at least one user interface of the testing framework;

wherein at least one of the modules is executed for performing, for each of the software testing projects, an analysis utilizing the data associated with the software testing project and data accessed from the knowledge repositories, the analysis being of a level of service provided by the testing framework for the software testing project and the analysis being performed according to different knowledge areas of the separate knowledge repositories and according to different benchmarks, wherein the analysis includes in part:

using the historical testing project information to locate patterns of items that require improvements for improving the service provided by the testing framework.

2. The computer program product of claim 1, wherein the computer program product is operable such that the at least one first repository includes official testing methodology generated and maintained by one or more testing experts.

3. The computer program product of claim 1, wherein the computer program product is operable such that the resources include a tool, a document template, a guide book, and a list.

4. The computer program product of claim 1, wherein the computer program product is operable such that the at least one second repository including the test project management information further includes project status information.

5. The computer program product of claim 1, wherein the computer program product is operable such that the at least one third repository including the test knowledge information includes an evolving set of repositories managed by experts.

6. The computer program product of claim 5, wherein the computer program product is operable such that the evolving set of repositories are actively updated by a general testing population with real hands-on knowledge.

7. The computer program product of claim 1, wherein the computer program product is operable such that the at least one fourth repository including the historical testing project information and the ongoing testing project information is used for analysis to improve current services by utilizing the historical testing project information to locate patterns of items that require improvements.

8. The computer program product of claim 1, further comprising computer code for generating at least one report utilizing the data associated with each of the software testing projects, the at least one report including a current view of a status of each of the software testing projects.

9. The computer program product of claim 1, wherein the computer program product is operable such that presenting the data associated with each of the software testing projects utilizing the at least one user interface includes presenting a step-by-step test management process associated with each of the software testing projects that itemizes required resources needed for each step.

10. A method, comprising:

providing, in a testing framework, a plurality of knowledge repositories, the knowledge repositories being separate and being contributed to by a plurality of users through a central location, and the knowledge repositories further including:

at least one first repository including official testing methodology organized according to a plurality of testing processes that include activity sets with each activity being linked to a unique set of resources;

at least one second repository including test project management information for use in managing software testing projects, the test project management information including guidelines and individual steps for the software testing projects which, for each of the software testing projects, are generated according to properties and a testing methodology associated with the software testing project;

at least one third repository including test knowledge information, the test knowledge information being used as input for updates to the official testing methodology in the first repository; and at least one fourth repository including historical testing project information and ongoing testing project information;

providing, in the testing framework, a plurality of modules corresponding to the knowledge repositories, the modules including:

a first module that supplies test knowledge to a second module associated with test processes and activities, a third module associated with the at least one fourth repository, a fourth module that includes an analytics layer of algorithms that analyzes the historical testing project information received from the third module and provides optimized answers to the second module, and a fifth module that provides test audit information to the second module;

executing the modules of the testing framework to execute each of the software testing projects to generate data associated with each of the software testing projects; and presenting the data associated with each of the software testing projects utilizing at least one user interface of the testing framework;

wherein at least one of the modules is executed for performing, for each of the software testing projects, an analysis utilizing the data associated with the software testing project and data accessed from the knowledge repositories, the analysis being of a level of service provided by the testing framework for the software testing project and the analysis being performed according to different knowledge areas of the separate knowledge repositories and according to different benchmarks, wherein the analysis includes in part:

using the historical testing project information to locate patterns of items that require improvements for improving the service provided by the testing framework.

11. A system comprising:

a memory system; and one or more processing cores coupled to the memory system and that are each configured to:

provide, in a testing framework, a plurality of knowledge repositories, the knowledge repositories being separate and being contributed to by a plurality of users through a central location, and the knowledge repositories further including:
- at least one first repository including official testing methodology organized according to a plurality of testing processes that include activity sets with each activity being linked to a unique set of resources;
- at least one second repository including test project management information for use in managing software testing projects, the test project management information including guidelines and individual steps for the software testing projects which, for each of the software testing projects, are generated according to properties and a testing methodology associated with the software testing project;
- at least one third repository including test knowledge information, the test knowledge information being used as input for updates to the official testing methodology in the first repository; and
- at least one fourth repository including historical testing project information and ongoing testing project information;

provide, in the testing framework, a plurality of modules corresponding to the knowledge repositories, the modules including:
- a first module that supplies test knowledge to a second module associated with test processes and activities,
- a third module associated with the at least one fourth repository,
- a fourth module that includes an analytics layer of algorithms that analyzes the historical testing project information received from the third module and provides optimized answers to the second module, and
- a fifth module that provides test audit information to the second module;

execute the modules of the testing framework to execute each of the software testing projects to generate data associated with each of the software testing projects; and present the data associated with each of the software testing projects utilizing at least one user interface of the testing framework;

wherein at least one of the modules is executed for performing, for each of the software testing projects, an analysis utilizing the data associated with the software testing project and data accessed from the knowledge repositories, the analysis being of a level of service provided by the testing framework for the software testing project and the analysis being performed according to different knowledge areas of the separate knowledge repositories and according to different benchmarks, wherein the analysis includes in part:

using the historical testing project information to locate patterns of items that require improvements for improving the service provided by the testing framework.

* * * * *